US009481768B1

(12) United States Patent
Prince

(10) Patent No.: US 9,481,768 B1
(45) Date of Patent: Nov. 1, 2016

(54) METHOD OF MIXING TO FORM COMPOSITION

(71) Applicant: Revolutionary Plastics, LLC, Las Vegas, NV (US)

(72) Inventor: Jack Raymond Prince, West Bountiful, UT (US)

(73) Assignee: REVOLUTIONARY PLASTICS, LLC, Las Vegas, NV (US)

( * ) Notice: Subject to any disclaimer, the term of this patent is extended or adjusted under 35 U.S.C. 154(b) by 240 days.

(21) Appl. No.: 14/214,067

(22) Filed: Mar. 14, 2014

Related U.S. Application Data

(60) Provisional application No. 61/798,804, filed on Mar. 15, 2013.

(51) Int. Cl.
C08J 3/20 (2006.01)
C08J 3/22 (2006.01)

(52) U.S. Cl.
CPC .......................................... *C08J 3/22* (2013.01)

(58) Field of Classification Search
CPC .................................. C08K 3/34; C08K 3/22
See application file for complete search history.

(56) References Cited

U.S. PATENT DOCUMENTS

| | | | |
|---|---|---|---|
| 3,981,840 A | 9/1976 | Yamamoto et al. | 260/42 |
| 4,198,327 A | 4/1980 | Matsumoto et al. | 260/4 |
| 4,243,575 A | 1/1981 | Myers et al. | 260/37 PC |
| 4,661,533 A | 4/1987 | Stobby | 521/122 |
| 5,177,139 A | 1/1993 | Klaar et al. | 524/484 |
| 5,296,420 A | 3/1994 | Garvie | 501/105 |
| 5,302,634 A | 4/1994 | Mushovic | 523/219 |
| 5,369,147 A | 11/1994 | Mushovic | 523/219 |
| 5,508,315 A | 4/1996 | Mushovic | 521/122 |
| 5,604,266 A | 2/1997 | Mushovic | 521/122 |
| 5,639,531 A | 6/1997 | Chen et al. | 428/49 |
| 6,110,855 A | 8/2000 | Moorhead et al. | 501/127 |
| 6,242,098 B1 | 6/2001 | Styron et al. | 428/402 |
| 6,269,952 B1 | 8/2001 | Watt et al. | 209/3 |
| 6,362,252 B1 | 3/2002 | Prutkin | 523/200 |
| 6,379,797 B1 | 4/2002 | Nikkeshi et al. | 428/403 |
| 6,583,217 B1 | 6/2003 | Li et al. | 524/650 |
| 6,669,773 B2 | 12/2003 | Malloy et al. | 106/705 |
| 6,695,902 B2 | 2/2004 | Hemmings et al. | 106/284.05 |
| 6,916,863 B2 | 7/2005 | Hemmings et al. | 523/218 |
| 7,195,473 B2 | 3/2007 | Sullivan et al. | 425/140 |
| 7,241,818 B2 | 7/2007 | Hemmings et al. | 523/218 |
| 7,879,939 B2 * | 2/2011 | Prince | C08K 3/22 524/442 |
| 8,106,105 B2 | 1/2012 | Cernohous | 521/83 |
| 8,419,405 B2 | 4/2013 | Prince et al. | 425/148 |
| 8,563,629 B2 * | 10/2013 | Prince | B29B 7/16 523/351 |
| 8,871,851 B2 * | 10/2014 | Prince | C08K 3/22 524/442 |
| 2002/0016224 A1 | 2/2002 | Pasqua, Jr. et al. | 473/376 |
| 2002/0040084 A1 | 4/2002 | Colmar et al. | 524/430 |
| 2002/0124775 A1 | 9/2002 | Hemmings et al. | 106/273.1 |
| 2002/0157799 A1 | 10/2002 | Sachs et al. | 164/4.1 |
| 2002/0170648 A1 | 11/2002 | Dinkel | 156/44 |
| 2002/0171164 A1 | 11/2002 | Halterbaum et al. | 264/53 |
| 2002/0185769 A1 | 12/2002 | Hasegawa et al. | 264/51 |
| 2003/0032707 A1 | 2/2003 | Hemmings et al. | 524/425 |
| 2004/0144287 A1 | 7/2004 | Tardif et al. | 106/705 |
| 2004/0266933 A1 | 12/2004 | Friedman et al. | 524/442 |
| 2005/0163969 A1 | 7/2005 | Brown | 428/151 |
| 2005/0171243 A1 | 8/2005 | Hemmings et al. | 523/218 |
| 2006/0276088 A1 | 12/2006 | DeWeese | 442/59 |
| 2008/0029925 A1 | 2/2008 | Brown | 264/166 |
| 2008/0114112 A1 | 5/2008 | Hemmings et al. | 524/425 |
| 2008/0119578 A1 | 5/2008 | Prince et al. | 521/91 |
| 2008/0306198 A1 | 12/2008 | Zucchelli et al. | 524/394 |
| 2009/0258777 A1 | 10/2009 | Tardif et al. | 501/53 |
| 2010/0256281 A1 | 10/2010 | Palama | 524/423 |
| 2011/0071252 A1 | 3/2011 | Prince et al. | 524/567 |
| 2011/0130501 A1 | 6/2011 | Prince et al. | 524/147 |
| 2011/0144243 A1 | 6/2011 | Prince et al. | 524/65 |
| 2011/0178198 A1 | 7/2011 | Backer et al. | 521/149 |
| 2014/0228498 A1 | 8/2014 | Prince et al. | 524/433 |

FOREIGN PATENT DOCUMENTS

| | | | |
|---|---|---|---|
| EP | 0640650 | 3/1995 | C08L 23/16 |
| GB | 2478696 | 9/2011 | B60C 1/00 |
| JP | 2000-226473 | 5/2000 | C08K 9/04 |
| JP | 2005-068305 | 3/2005 | C08L 101/00 |
| WO | WO9937592 | 7/1999 | C04B 14/00 |
| WO | WO2009136185 | 11/2009 | C08K 3/00 |
| WO | WO2012121970 | 9/2012 | C08J 3/22 |
| WO | WO2013043454 | 3/2013 | C08L 101/00 |
| WO | WO2013082024 | 6/2013 | C08L 101/00 |

OTHER PUBLICATIONS

Barnes et al., "Ash Utilisation from Coal-Based Power Plants," UK Department of Trade and Industry commissioned study, Jan. 2006 (30 pgs).
RockTron Technology Overview, IGEM 2010 (Part 1—20 pgs).
RockTron Technology Overview, IGEM 2010 (Part 2—20 pgs).
RockTron Technology Overview, IGEM 2010 (Part 3—20 pgs).
RockTron Technology Overview, IGEM 2010 (Part 4—180 pgs).
Office Action issued in U.S. Appl. No. 14/344,043 dated Jan. 15, 2015, 14 pgs.
Office Action issued in U.S. Appl. No. 14/002,629 dated Mar. 18, 2015, 17 pgs.

(Continued)

*Primary Examiner* — Hannah Pak
(74) *Attorney, Agent, or Firm* — Hayes Soloway P.C.

(57) ABSTRACT

A fly ash material or other filler or combination of the two having a particle size distribution is mixed with a liquid coupling agent in a sealed mixer that is heated to gasify the coupling agent for association with the varied particles of the filler. An acid scavenger, an antioxidant, a compatibilizer and an impact modifier may be mixed with a base resin or target resin to form a master batch or the final composition. Either the master batch or the final composition is mixed with a blend of a mineral oil and a styrenic block copolymer in addition to low melt or fractional melt resins.

15 Claims, 10 Drawing Sheets

(56) References Cited

OTHER PUBLICATIONS

Office Action issued in U.S. Appl. No. 14/002,629 dated Sep. 17, 2015.
Notice of Allowance issued in U.S. Appl. No. 14/344,043 dated Jun. 30, 2015.
Notice of Allowance issued in U.S. Appl. No. 14/002,629 dated Nov. 19, 2015.
Brandup et al., Polymer Handbook, 4$^{th}$ edition, John Wiley & Sons, 1999, p. V/16.
"Wanted Waste: Fly Ash", Chemisty & Industry (London, United Kingdom), Mar. 8, 2010, pp. 24-26.
Deepthi, et al, "Mechanical and thermal characteristics of high density polyethylene-fly ash Cenospheres composites", Material and Design, vol. 31, pp. 2051-2060 (2010).
GRT-Pozzolans, Material Safety Data Sheet of Class C fly ash, Jan. 8, 2014.
Huang et al., "Processed Low NOx Fly Ash as a Filler in Plastics", Journal of Minerals & Materials Characterization & Engineering, vol. 2, No. 1, pp. 11-31, 2003.

\* cited by examiner

METHOD OF MIXING TO FORM COMPOSITION

CROSS REFERENCE TO RELATED APPLICATION

This application claims priority from U.S. Provisional Application Ser. No. 61/798,804, filed Mar. 15, 2013, the contents of which are incorporated herein by reference.

BACKGROUND OF THE INVENTION

1. The Field of the Invention

A method of preparing a base blend for use in forming composition such as a master batch is disclosed in which the base blend of filler is mixed with other materials such as a silane compound to enhance bonding as well as other materials such as an acid scavenger and an antioxidant. The base blend is then mixed with other materials such as a suitable carrier resin and a particle encapsulator to form a mixture that is then combined with a base resin to form a composition.

2. The Relevant Technology

A resin like polyethylene and/or polypropylene is typically selected for desired physical properties some of which can be controlled using additives that include colorants, lubricants, stabilizes, foaming agents and various fillers. Traditionally, fillers have been used to lower the cost of a composition. In turn, the resulting product is less expensive because expensive resin is being replaced by less expensive filler. Fillers may also be used to control some of the physical properties such as strength, hardness, impact resistance, sheer and other structural characteristics of the resulting material.

Fillers are also known to have some impact on processing characteristics of a melt. For example, unfilled polymers behave like non-newtonian fluids with viscosity changing during melt processing. Additives impact on the rheology except that increasing the amount of the filler (regardless of the shape of the particles of the filler) leads to reduced melt elasticity. M. Xanthos, *Functional Fillers For Plastics* (Wiley—VCH 2005) pp. 32-35.

Fly ash, cinders and combinations of fly ash and cinders have been identified as fillers that can be used with resins in a beneficial manner as disclosed in U.S. Pat. No. 7,879,939 (Prince et al.) (hereinafter the '939 Patent).

Fly ash as well as the cinders vary in chemical and physical make up based on, among other things, the specific source of the hydrocarbon like coal and the combustion process. In turn, fly ash varies in physical make up from source to source (e.g., electrical power plant) and even within a given source as combustion processes and raw materials are varied. In turn, fly ash by itself and also together with cinders have not been used as a filler because its physical and chemical make up is not standard or consistent.

To create a standard or consistent fly ash composition that is optimized, U.S. Patent Application Publication 2011/0071252 published Mar. 24, 2011 (the '252 Publication) discloses methods and procedures to select an optimized filler or filler blend. In other words, fly ash with and without cinders can be treated and blended or mixed to form a filler that is useful when introduced into molten compositions as disclosed in the '939 Patent.

It is also known to use certain additives with the fillers to control the physical properties in the manufacture of a wide variety of products from or using resin. Some additives are difficult to add because they cannot be mixed into a dry blend without causing the formation of lumps and clumps that interfere with dispersion and uniformity. Further, some additives are expensive and are better replaced with other additives that lead to reduced cost over all for the products. But it has not been known how to effectively blend wet additives in a dry material so that later combinations with selected resins can be effected more efficiently to control physical properties.

BRIEF SUMMARY

To form a composition which is a plastic resin involves use of a mixer. A filler is added to the mixer. The filler has a selected particle size distribution in which over ten percent of the particles of the filler (by number) have an effective diameter of less than 1 micron. A coupling agent material is added to the mixer by injecting it into and mixing it with the filler as the filler is heated preferably by mixing or stirring. The mixer has a bowl or volume which is sealed. The liquid additive is a coupling agent which changes from a liquid to a gas. The filler and the gas are mixed so that particles of the gas associate to or with the small particles of the filler. Thereafter the filler with the coupling agent material are cooled and later mixed with other ingredients to form either the composition or a master batch.

In preferred processes the coupling agent is either silane liquid or a liquid with silane and peroxide flakes.

A composition is also disclosed in which silane as a coupling agent is combined with optimized fillers, high levels of fractional melt resin and a combinations of LDPE (low density polyethylene), LLDPE (linear low density polyethylene) and HDPE (high density polyethylene) resins. These combinations of polyethylene (PE) resins are not only applicable to PE but polypropylene (PP) resins. The combinations also can be varied to control the physical properties of the ultimate product along with improved crystallization or cycle time during fabrication.

BRIEF DESCRIPTION OF THE DRAWINGS

To further clarify the above and other advantages and features of the present process as here disclosed, a more particular description of the process will be rendered by reference to the appended drawings. It should be understood that the drawings depict only a typical embodiment of the process and therefore are not to be considered limiting of the scope of the appended claims. More specifically:

DESCRIPTION

Figure 1:
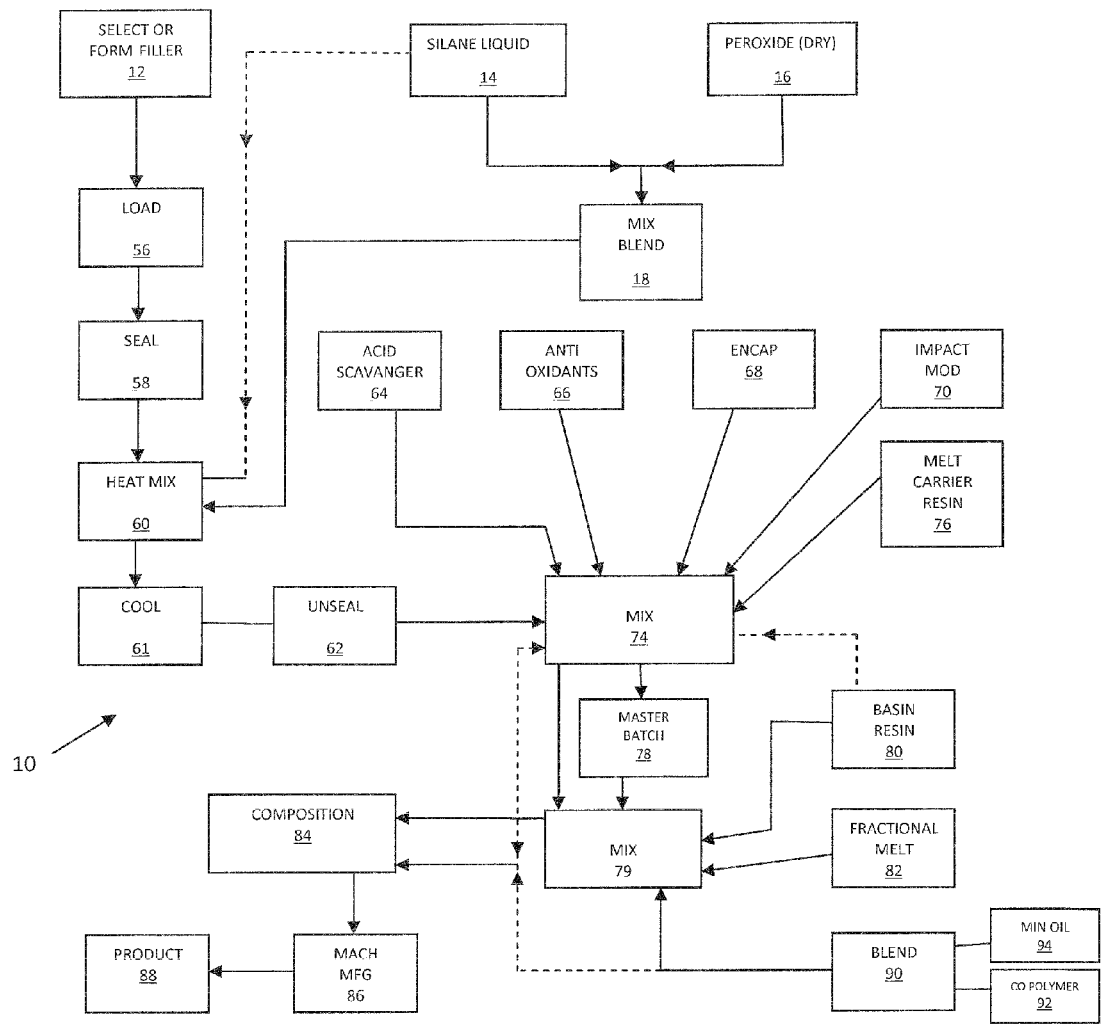
FIG. 1 is a block diagram of a method of forming a composition as disclosed.

Reference will now be made in more detail to FIG. 1 which illustrates a typical process for forming the desired compositions exemplified by the data from several examples as set forth hereinafter. It should also be understood that the drawing and the examples are not intended to limit the scope of the embodiments disclosed. Rather, alternatives, modifications and equivalents are within the spirit and scope of the inventions herein disclosed and claimed.

The process 10 illustrated or depicted in FIG. 1 leads to the formation of a composition that, when compared with unmodified resin used commercially, has improved physical properties while using materials that lead to lower material costs and, in some cases, faster cycle times.

It may also be noted that process 10 of FIG. 1 involves use of a filler 12 comprised of particles which can vary in size from large to small. Normally the particles range in size from up to about 1000 microns to sub micron in size. The filler 12 preferably has a particle size distribution in which at least ten percent (10%) of the total number of particles are less than 1 micron (i.e., submicron) in effective diameter where 1 micron is $1 \times 10^{-6}$ meter (also written as 1 µm). More preferably, over half of the total number of particles are sub micron. Desireably, over 90% of the total number (quantity) of particles of the filler 12 are less than 1 micron in effective diameter. That is, the particles may not be spherical but in some other shape which may best be described by using the effective diameter which is the diameter which best approximates the particle if it were spherical. While some particles are not spherical and may have a certain aspect ratio, it is understood that the optimized combination of this mixture can in fact help these non spherical particles flow more efficiently than they otherwise would and therefore be a contributing part of the formulation as opposed to being a detriment to the process.

Suitable fillers 12 can be formed by sifting or filtering to attain a volume/batch of filler or continuous supply of the desired particle size distribution (PSD). In some cases, the filler 12 may be formed using sources that have different PSD's by using optimizing procedures to attain the desired PSD as disclosed in U.S. Patent Application Publication 2011/0071252 published Mar. 24, 2011.

The filler 12 is preferably a fly ash and thus is selected or formed of material otherwise considered waste or residue. That is, fly ash materials are regarded as a waste by-product of combustion. In turn, it can be seen that forming compositions as herein disclosed has environmental benefits in that the fly ash is being converted from a waste material destined for landfills to a beneficial use consistent with and promoting principles of sustainability. The fly ash may be processed by sifting or using filters to attain the desired PSD; and also optionally the fly ash may be processed through demagnetizers to remove magnetic particles like iron oxide that is sometimes found in raw fly ash. That is, some fly ash materials contain minute quantities of iron oxide or other oxidation by products that may be removed by processing the fly ash through a magnetic field. The process of removing such particles is optional.

While the filler 12 is presently entirely fly ash, it should be understood that the filler 12 may be something other than fly ash or include in whole or in part another filler or fillers so that it is a blend. Also, other additives can be supplied and blended into the filler 12. For example, colorants may be added at this early stage as well as other dry materials that may be desirably mechanically mixed or blended with the fly ash. While it has been suggested that liquid silane coupling agent may be added to the filler 12, it has been found to be less than efficacious to do so because it can lead to some lumping and clumping. That is, small collections of particles may stick together because the silane wets only a portion of the materials which are then glommed or otherwise stuck together to form small lumps or clumps. The existence of such lumps and clumps of course adversely affect the uniformity of the mixture.

While mixing the silane directly into the filler 12 has proven to be less than optimum, it can be seen that in the disclosed process, silane 14 as a liquid is preferably mixed with a small amount of dry peroxide 16. That is, the silane 14 and dry or powder peroxide 16 are mixed together to form a liquid blend 18. The blend 18 is added to a mixer 20 (FIG. 2) which contains the filler 12 as hereinafter discussed. While mixing the silane 14 with the peroxide to form the blend 18, the temperature of the blend should be maintained at or below 75 degrees Fahrenheit or the flash point of the liquid additive. The blend 18 or the silane 14 should be maintained below 75 degrees to keep it in liquid form before it is mixed with the filler 12 in the mixer 20 as discussed hereinafter.

Figure 2:
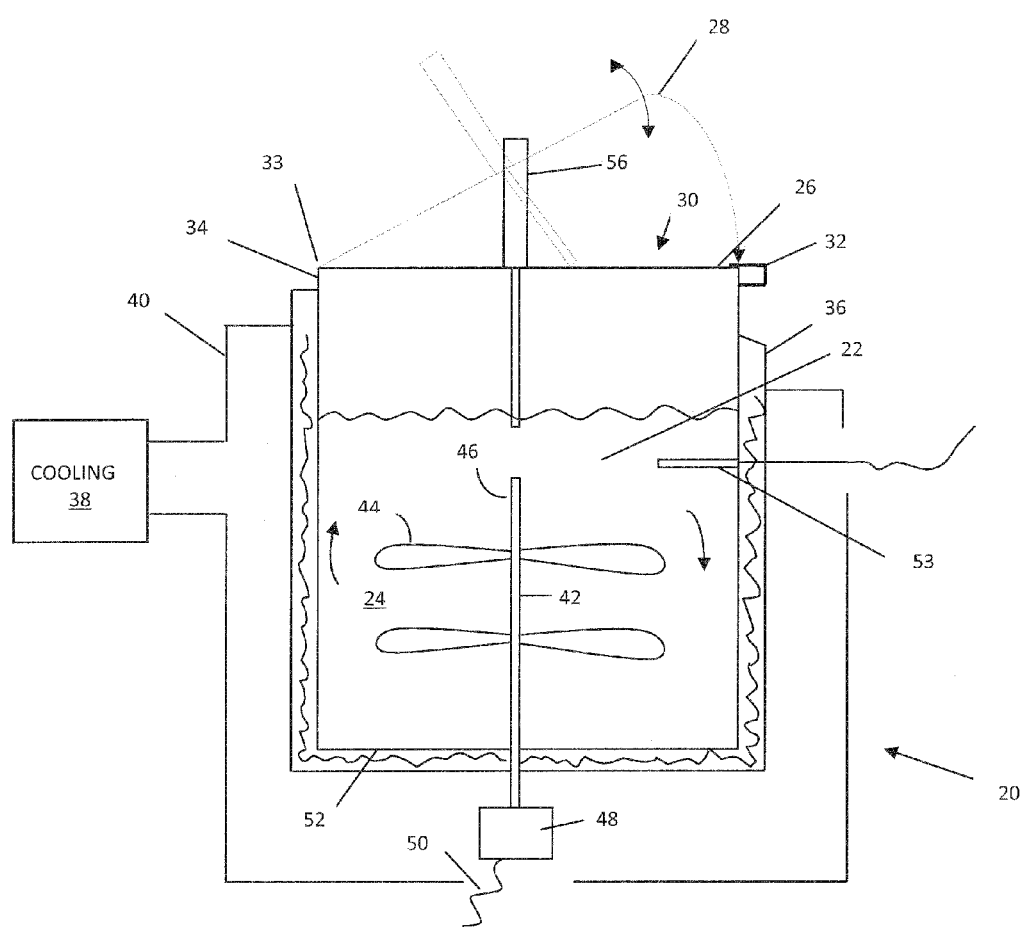
FIG. 2 is a simplified cross sectional illustration of a mixer for use in the method of forming a composition disclosed.
Figure 3:
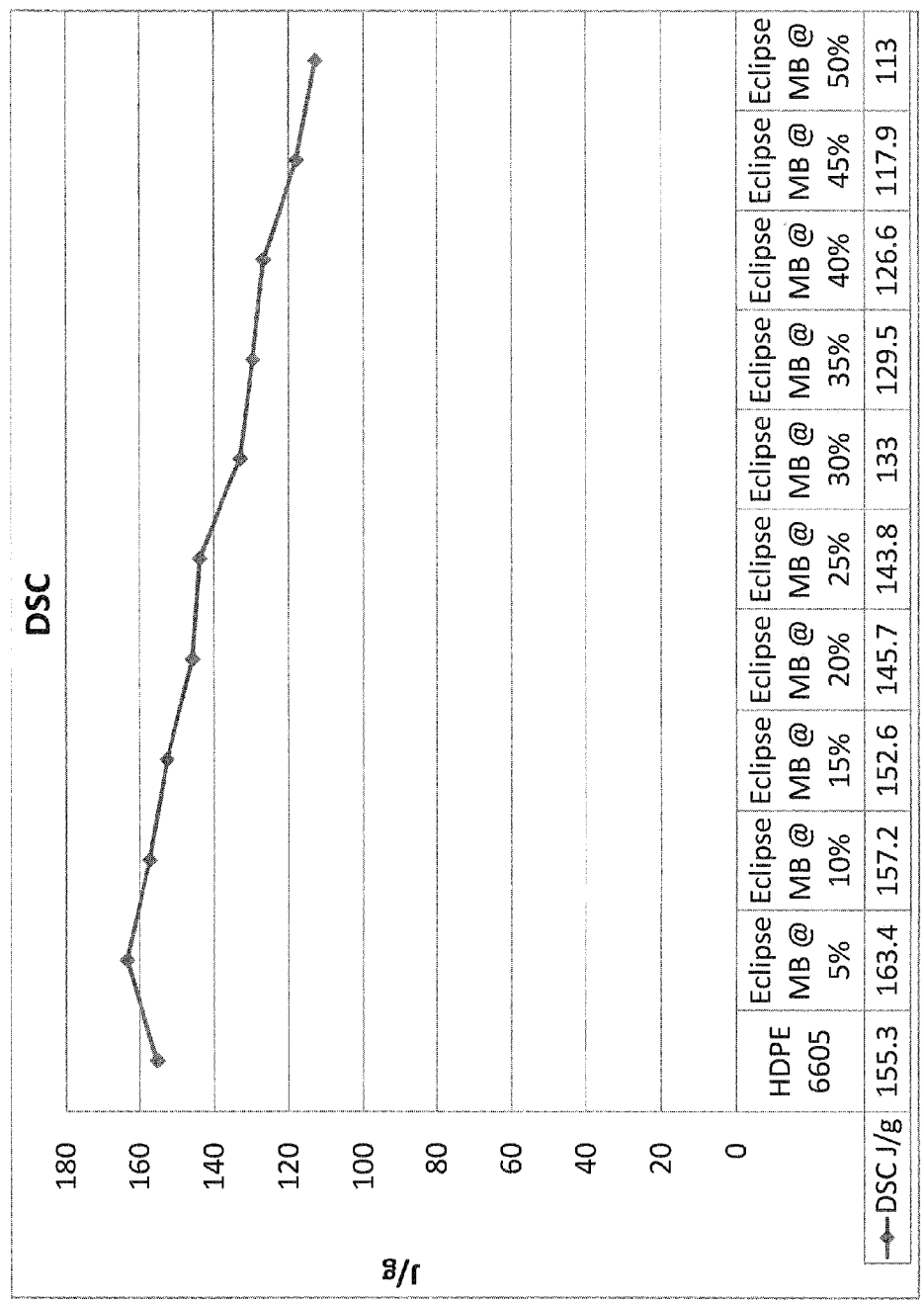
FIG. 3 is graph showing the time to crystallize using a Differential Scanning Calorimeter for ExxonMobil HDPE HD 6605 with increasing amounts of master batch.
Figure 4:
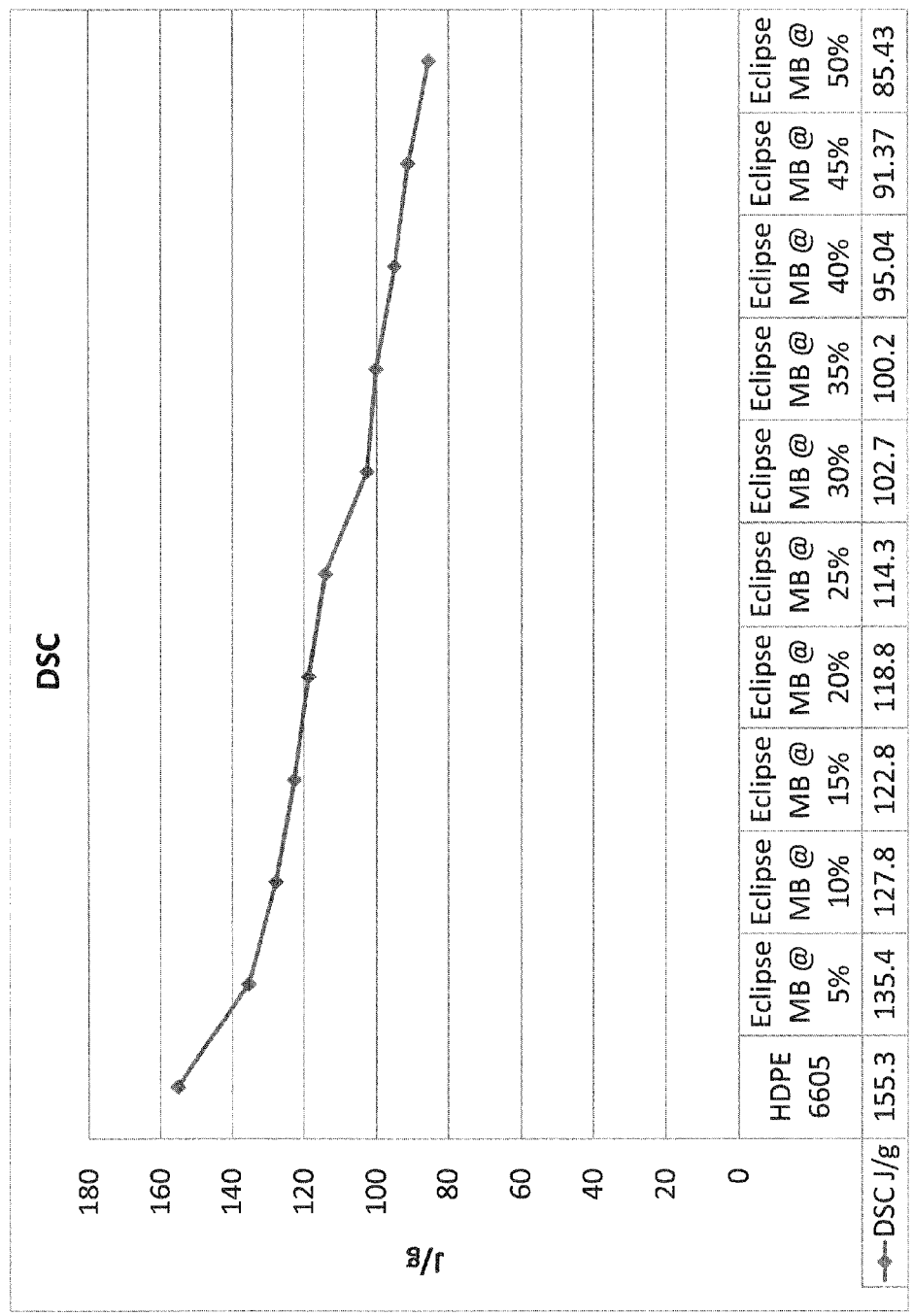
FIG. 4 is graph showing the time to crystallize using a Differential Scanning Calorimeter for ExxonMobil HDPE HD 6605 combined with a fractional melt with increasing amounts of master batch.
Figure 5:
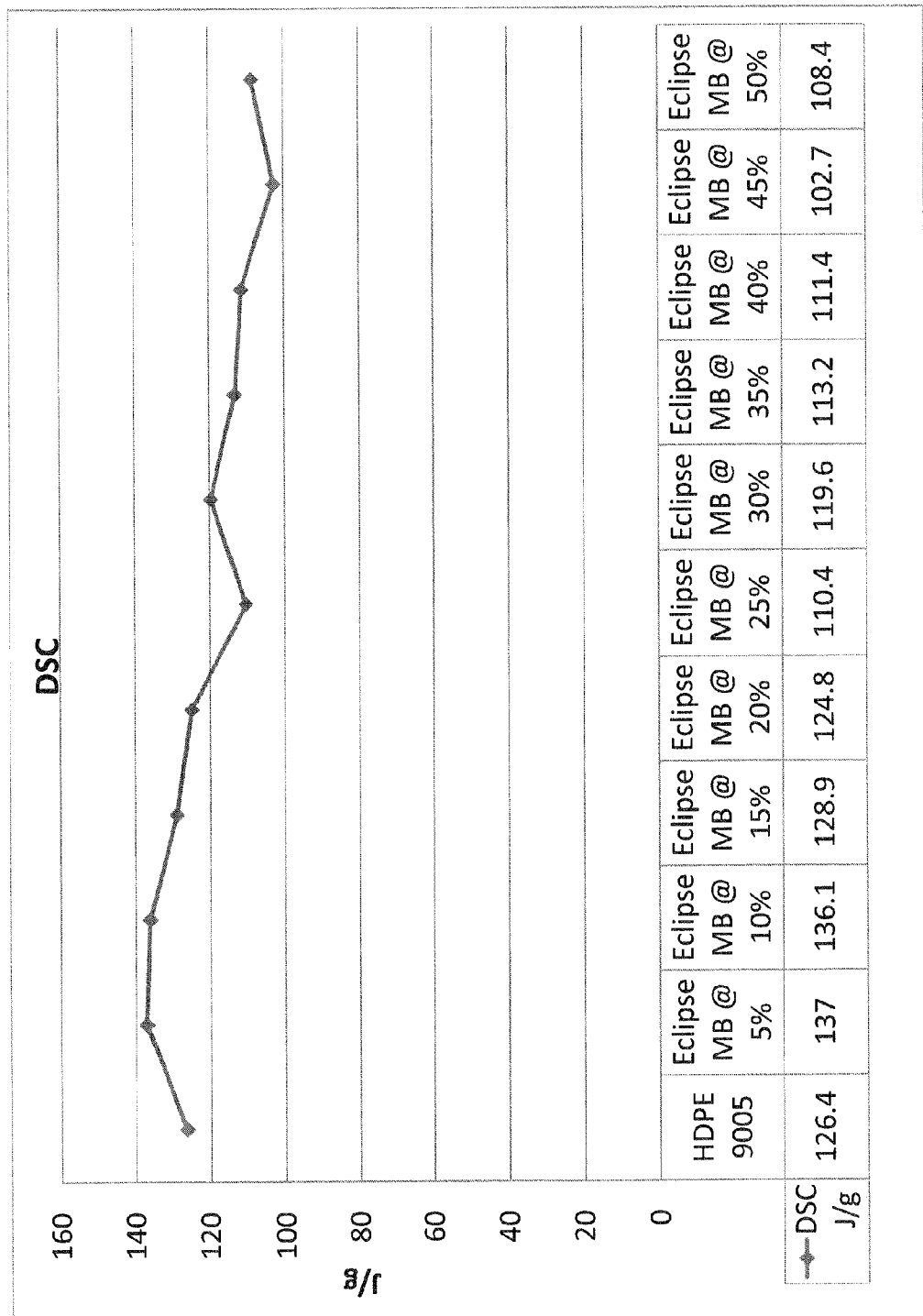
FIG. 5 is graph showing the time to crystallize using a Differential Scanning Calorimeter for Chevron Phillips Marlex 9005 HDPE with increasing amounts of master batch.
Figure 6:
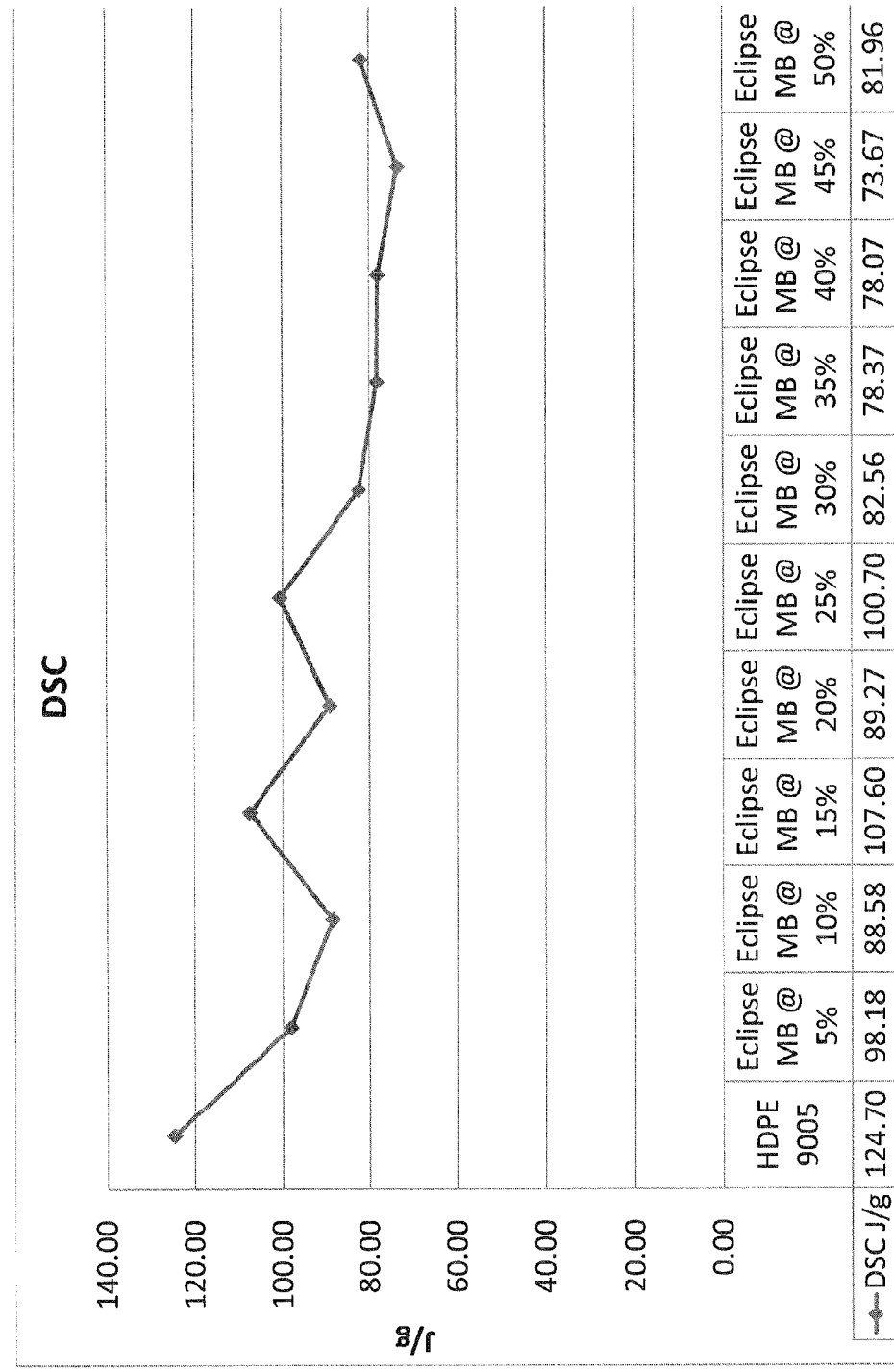
FIG. 6 is graph showing the time to crystallize using a Differential Scanning Calorimeter for Chevron Phillips Marlex 9005 HDPE combined with a fractional melt with increasing amounts of master batch.
Figure 7:
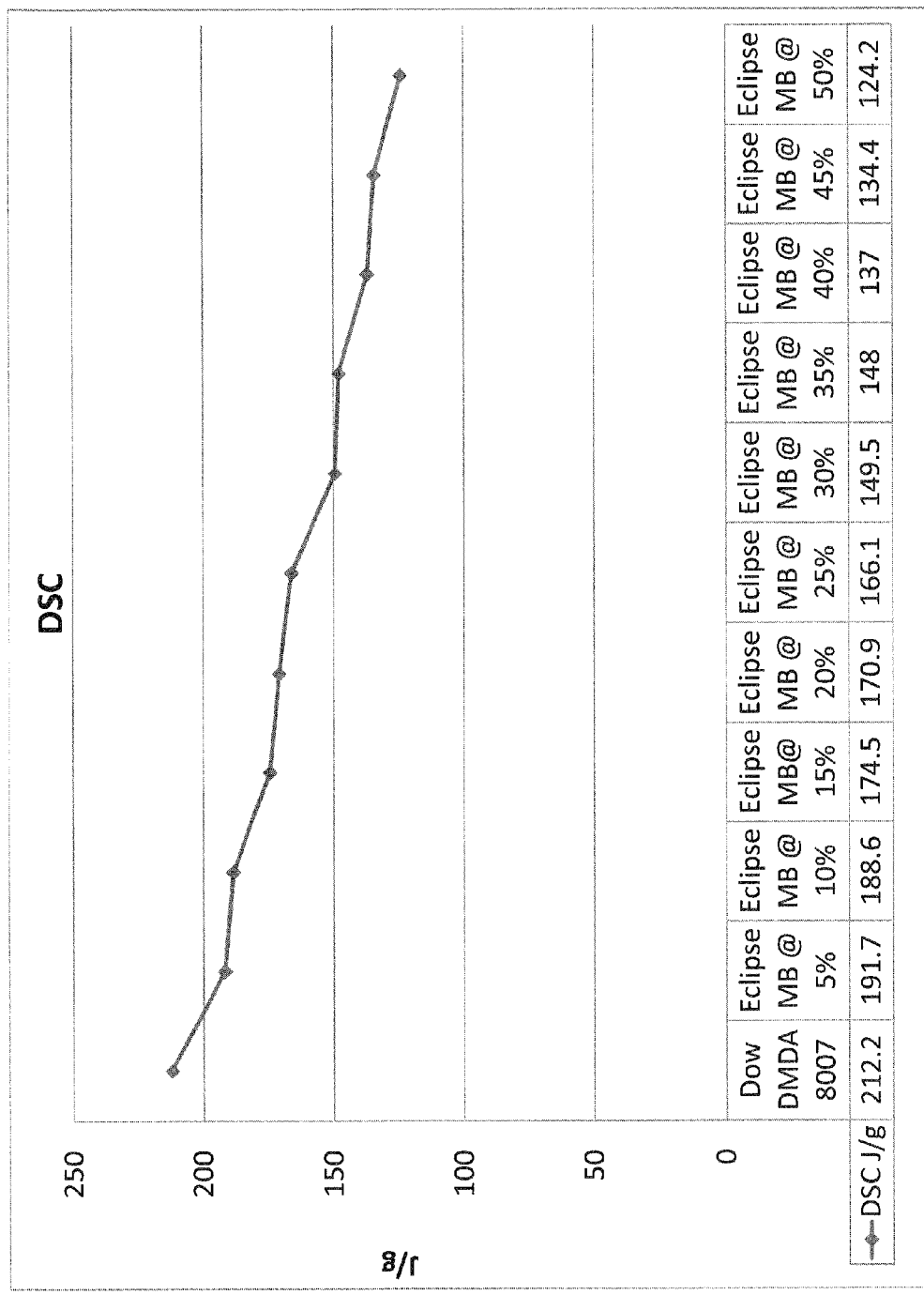
FIG. 7 is graph showing the time to crystallize using a Differential Scanning Calorimeter for Dow DMDA 8007 HDPE with increasing amounts of master batch.
Figure 8:
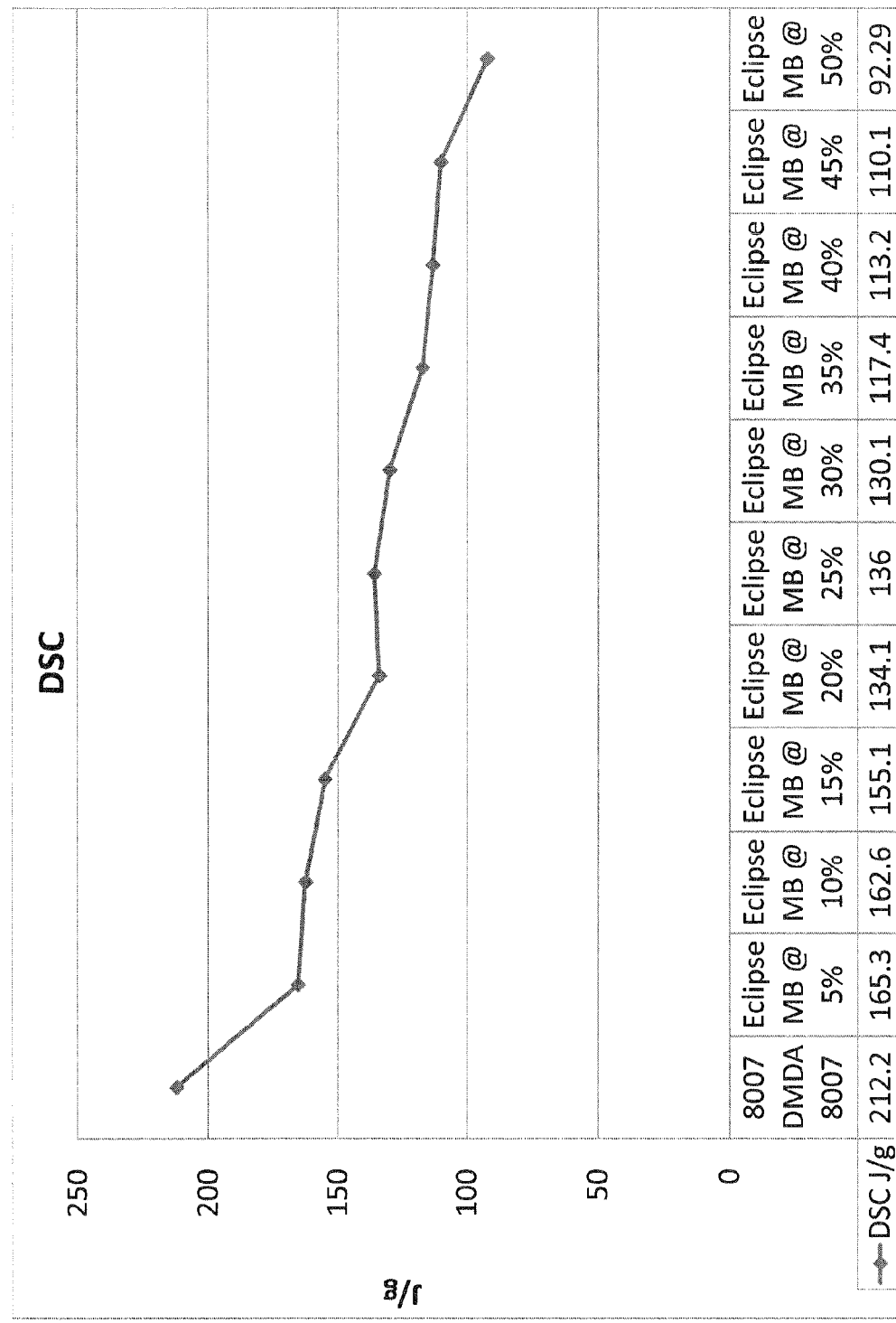
FIG. 8 is graph showing the time to crystallize using a Differential Scanning Calorimeter for Dow DMDA 8007 HDPE combined with a fractional melt with increasing amounts of master batch.
Figure 9:
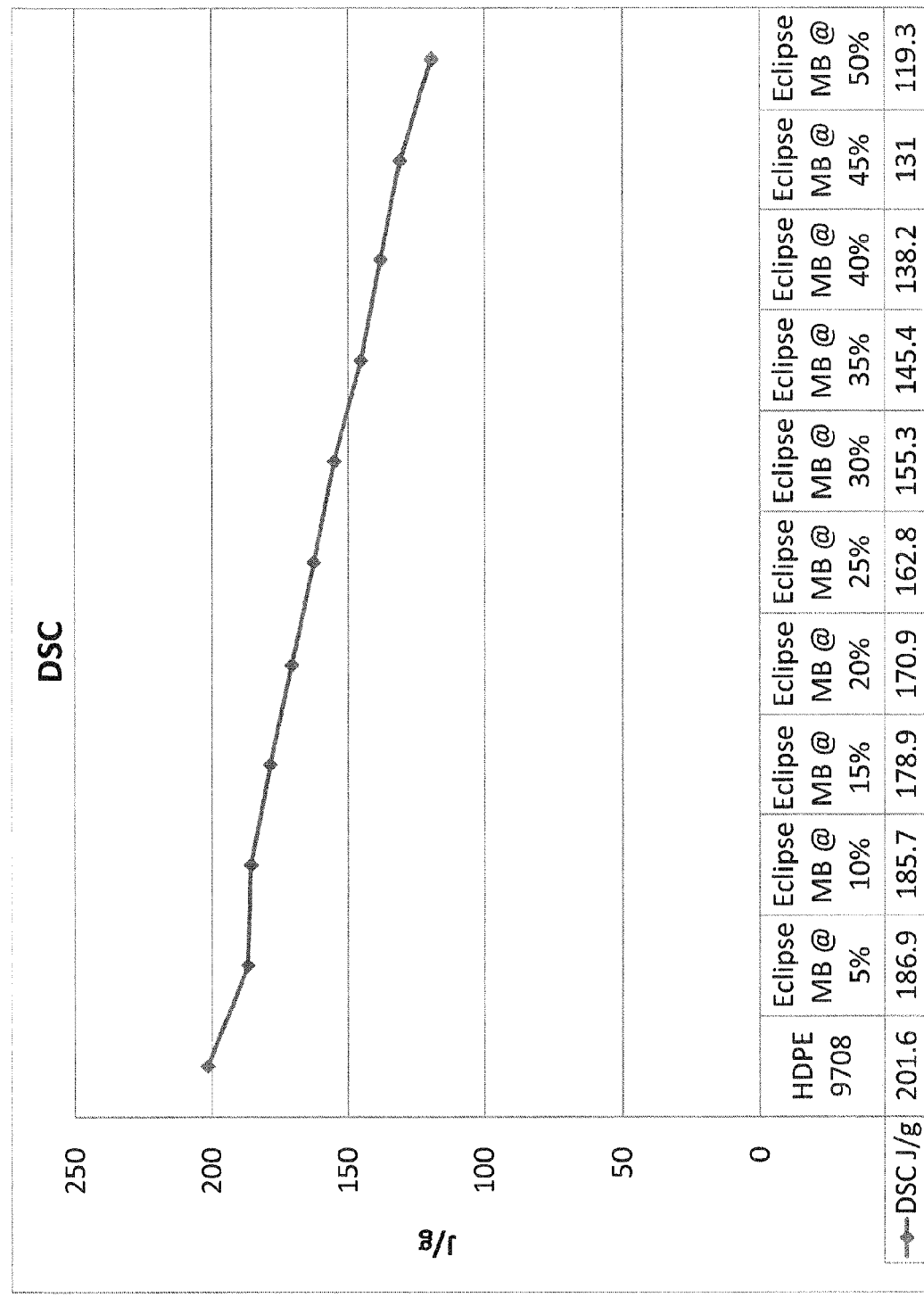
FIG. 9 is graph showing the time to crystallize using a Differential Scanning Calorimeter for Chevron Phillips Marlex 9708 HDPE with increasing amounts of master batch.
Figure 10:
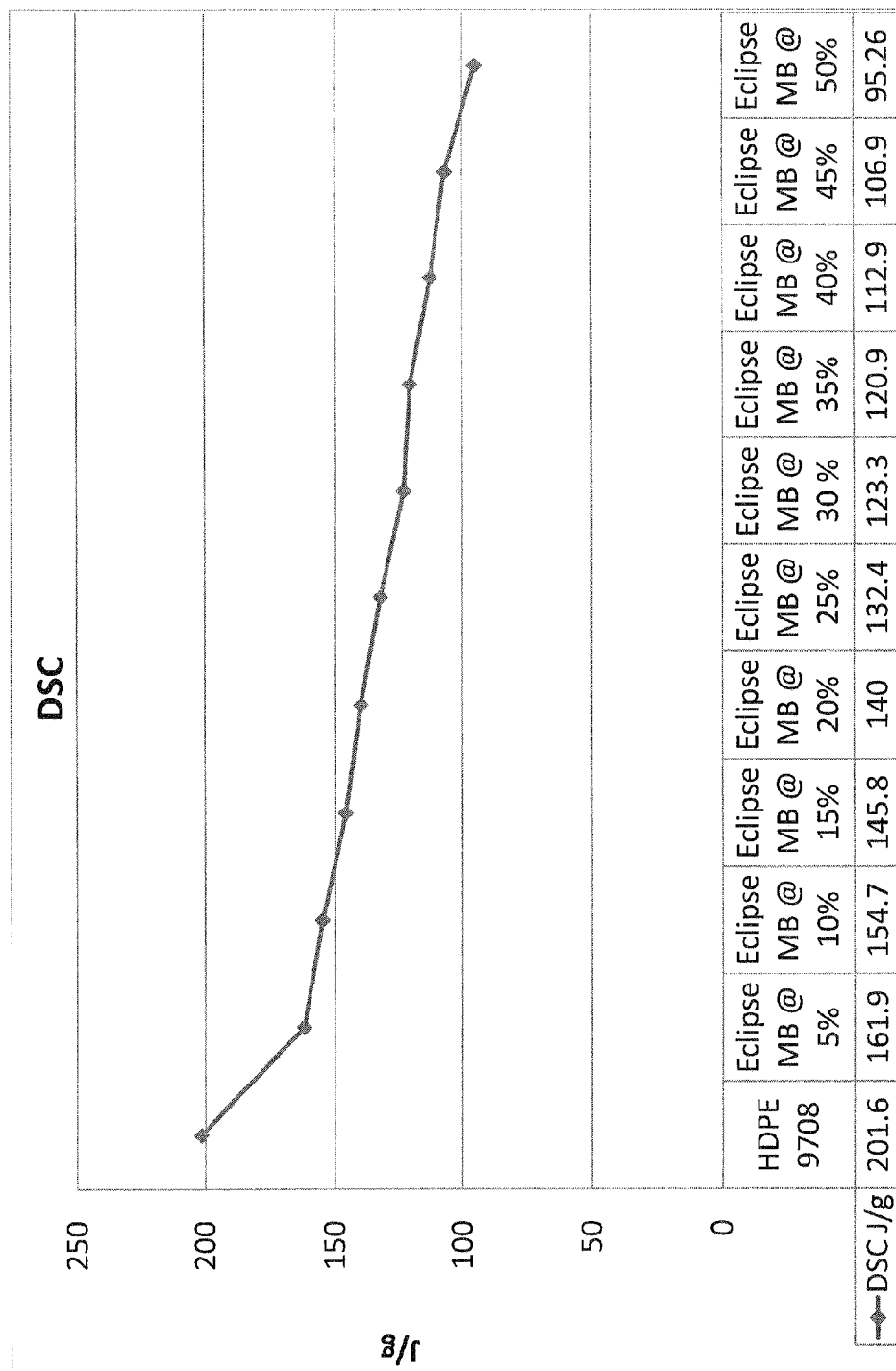
FIG. 10 is graph showing the time to crystallize using a Differential Scanning Calorimeter for Chevron Phillips Marlex 9708 HDPE combined with a fractional melt with increasing amounts of master batch.

The mixer 20 depicted in FIG. 2 represents a mixing function in which any suitable mixing machine or arrangement can be used to mechanically mix the filler 12 and the liquid silane 14 in a sealed enclosure. That is, the mixer 20 may be in any size or shape with structure to define a volume 24 sized to receive the load 22. The mixer 20 has sealing means to seal the volume 24. The sealing means is here shown as the lid 26 which operates between an open or unsealed position 28 in which the volume 24 is accessible to position or receive the filler 12 and to remove the filler 12 with the silane 14 or blend 18 added after processing as herein after discussed. The lid 26 is also movable to the closed position 30 in which the lid 26 is positioned over the volume 24 and sized to seal to the wall 34 and in turn seal the volume 24. As here illustrated, the lid 26 is positioned over the wall 34 of the mixer 20 and held sealingly in place against the wall 34 by suitable clamps or levers positioned around the perimeter of the lid 26 such as clamp 32. The lid 26 may be totally removable from the wall 34 or hinged thereto by hinge 33. The wall 34 as well as the lid 26 are preferably made of a suitable metal that is maintained at a temperature which is typically room temperature at or around 70 degrees Fahrenheit so that it is above the dew point of the silane 14 and/or blend 18 to be added as discussed hereinafter.

The mixer 20 of FIG. 2 also has a cooling jacket 36 positioned about its wall 34 which can be cooled by a suitable cooling fluid 40 supplied by a cooling system 38. Any suitable refrigerant or chilled water system may be used. Depending on air temperature, one may also add a plurality of cooling fins (not shown) to allow for air cooling. Alternately, a separate cooling tank remote from the mixing machine may be provided to effect the desired cooling. A suitable heating system comparable to the cooling system may also be used in conjunction with the mixer 20 as necessary to heat the material in the volume 24 and/or to heat the mixer wall 34 and the lid 26. That is, heating coils or heating elements (not shown) may be placed proximate the mixer 20 to heat the wall and in turn the material in the volume. Of course a preheating system may also be used to raise the temperature of the filler 12 to a temperature close to the temperature in which the silane 14 and blend 18 will transform from liquid to gas.

The mixer 20 is here shown to have a mixing device 42 that has blades 44 on a shaft 46 rotated by a motor 48 that is electrically powered via a suitable conductor 50. The mixing device 42 may have any suitable combination or configuration of blades 44 which rotate in the volume and mix the materials therein which is the filler 12 and either the silane 14 or the blend 18. The blades 44 may be made of any suitable sturdy material such as wood, and metal. When metal is used, it has been found that the blades as preferably kept at or above the dew point of the silane 14 and the blend 18 to avoid plating of the silane 14 and/or the blend 18 on the blades 44. As the blades 44 rotate through the material, they frictionally interface with the material such as the filler 12 and in turn heat the material in the volume 24. The mixing device 42 is here shown extending into the volume 24 from the bottom 52 of the mixer 20 as a convenience for illustration. It may also extend into the volume 24 from the wall 34 and/or from the lid 26. Extended operation of the mixing device 42 raises the temperature of the material in the volume 24 to a desired temperature as measured by a temperature probe 53. The desired temperature is above 82 degrees Fahrenheit and preferably maintained at a temperature from about 90- to about 100 degrees Fahrenheit to urge the liquid silane 14 and the liquid blend 18 to transform from a liquid to a gas. Of course other forms of heating or a heating system may be used to assist in raising the temperature of the materials in the volume 24 including the silane 14 and the blend 18.

An injector 56 may also be positioned in the lid 26 to extend into the volume 24 when the lid is in the closed position 30 as shown in FIG. 2. It may also extend through any other surface or structure such as the bottom 52 or the wall 34. The injector 56 may be any suitable device such as a small piston pump configured to inject or insert liquid such as the silane 14 as a liquid or the blend 18 as a liquid. That is, to avoid lumping or clumping, the silane 14 and the blend 18 are injected into the heated filler 12 in the volume 24 where the liquid silane 14 or liquid blend 18 are converted into a gas which has many particles. The gas particles are dispersed into and mixed into and with the filler 12 with gas particles attaching to the small particles or sub micron particles of the filler 12. As a gas particle (possibly a molecule) attaches to a fly ash particle, the filler 12 remains effectively a dry material which can be further processed as herein after discussed.

As seen in FIG. 1, the filler 12 such as a fly ash is loaded 56 into the mixer 20 while the lid 26 is in the open position 28. The lid 26 is then put in the closed position 30 to effect a seal 58. Thereafter, the mixer 20 (FIG. 2) is operated to mix 60 the filler 12 with the silane 14 or blend 18 each being injected by the injector 56. Upon reaching a temperature (over 82 degrees Fahrenheit) to effect gas dispersion of the gas particles of silane 14 or blend 18, the mixing device is operated for about 5 minutes for each batch of material loaded into the mixer 20. However, it should be noted that the specified time may vary depending on the efficiency of the mixer and understanding that the time isn't important so much as the process of transforming from a liquid to a gas while thoroughly mixing and then cooling back to below the flash point of the liquid.

After reaching temperature and being mixed for the time necessary to effect gas dispersion in the filler 12, the mixer 20 is then cooled 61 by using cooling means such as the cooling system 38. In that process, the silane 14 and the blend 18 each are believed to dry to and attach to the filler particles. While not all gas particles do not necessarily attach to filler particles and while all filler particles do not necessarily have gas particles attached, it is presently understood that a substantial portion of the sub micron particles of the filler 12 have gas particles adhered thereto. The mixer 20 is then cooled 61 and unsealed 62. Alternately the material in the volume may be taken to a separate cooler (not shown). After cooling the mixture of filler 12 with the silane 14 or blend 18 then supplied for mixing 74 with an acid scavenger 64, an antioxidant 66, an encapsulator 68, an impact modifier 70 (e.g., a fractional or low melt index resin) and a melt carrier resin 76. The mixer 20 illustrated in FIG. 2 is functionally comparable to a suitably sized and configured Henschel or Reimelt-Henschel mixer widely available including its U.S. distributor, Henschel America, Inc. of Green Bay, Wis.

As seen in FIG. 1, the mixing 79 may be completed in a way to produce a master batch 78 intended for further mixing with a base resin 80 and optionally a fractional melt resin(s) 82 to be detailed later. Alternately or optionally, the mix 74 may be formulated with the base resin 80 for direct delivery as the composition 84.

The acid scavenger 64 like hydrotalcite is introduced into the master batch 78 in small quantities to reduce the acid that can form when mixing the filler 12 and other materials to form the master batch 78 or composition 84. The antioxidant 66 may be a benzene material such as ANOX® NDB® blend available from Chemtura; and it is introduced to minimize the oxidation when mixing 74. Chemtura has offices through out the world with offices in the United States in Middlebury, Conn. ALKANOX® is a phosphorous based antioxidant that can be used and is available also from Chemtura and may be used as an antioxidant. Combinations of ANOX® and ALKANOX® antioxidants may be used as well.

The impact modifier 70 is a low melt or fractional melt resin that has a melt flow index (MFI) at or below 15 and typically a melt flow index of less than 1, as measured using ASTM D1238. The impact modifier 70 may even be recycled plastic or waste production called "regrind", adding to the sustainability features of the process. Typically, the impact modifier 70 selected is lower in cost than the base resin 80 while maintaining comparable or improved physical properties for the ultimate product 88 to those of the base resin 80 without the impact modifier 70. Marlex® HHM 5202 high density polyethylene and Marlex® HHM 5502 high density polyethylene (HDPE) available from Chevron Phillips Chemical Company of Woodlands, Tex. have been found to be particularly suitable as an impact modifier.

In addition to and as another option, the LDPE (low density polyethylene and or LLDPE (linear low density polyethylene) may be combined with HDPE (high density polyethylene) to be the base resin 80. The combination reduces the time for the final compound to crystallize during production. In other words, the final compound crystallizes more rapidly, and in turn the final composition 84 will set up faster in the molding process 86 than processes in which silane is absent from the master batch formulation. A faster crystallization allows one to remove the final product 88 sooner or faster than in processes where silane is absent. Faster cycle time leads to faster through put and increased production in a shorter period of time.

The graphs attached as FIGS. 3-10 show comparisons of 4 Polyethylene base resins 80 that are commercially available, namely: ExxonMobil HDPE HD 6605, Chevron Phillips Marlex 9005 HDPE, Chevron Phillips Marlex 9708 HDPE & Dow DMDA 8007 HDPE. These base resins were mixed with a master batch 78 in amounts that were increased in increments of 5% from 0% to 50%. Time to Crystallize readings were taken using a DSC machine at each percentage loading. Differential Scanning Calorimetry (DSC) is widely used to characterise the thermophysical properties of polymers. DSC can measure important thermoplastic properties including:

Melting temperature
Heat of melting
Percent crystallinity
Crystallization
Presence of recyclates/regrinds
Plasticize
Polymer blends (presence, composition and compatibility)

Each of the base resins 80 were also combined with a fixed amount of fractional melt resin 82 as the master batch 78 was increased incrementally 5% and the base resin was decreased incrementally as well. Comparisons were made using only Chevron Phillips Marlex HHM 5502BN HDPE as the fractional melt impact modifier and then combining Chevron Phillips Marlex HHM 5502BN HDPE in equal amounts with Westlake Chemical EN1807 LDPE. As the graphs seen in FIGS. 3-10 show, the time to crystallize is significantly improved when the HDPE is combined with the LDPE.

Styrenic block copolymer, such as SEPTON® copolymer may also function as an impact modifier. SEPTON® copolymer comes in pellet form and can be added directly into the mixing 74. SEPTON® copolymer also comes in flake form (such as SEPTON® 4033) which should be combined with a mineral oil in order for the SEPTON® copolymer to melt sufficiently at normal extrusion temperatures used to melt-process or mix 74. The amount of oil used to combine with the SEPTON® 4033 affects the elasticity of the master batch 78 and even the final composition 84. Different amounts and kinds of mineral oil can be used to control the elasticity. The use of a blend of SEPTON® 4033 as a copolymer and mineral oil typically in a 90/10 ratio is preferred.

Inasmuch as the filler 12 is a mineral composite and may be a ceramic or ceramic-like material in particulate form (e.g., a powder) among molten thermoplastics, it is believed to be important that each particle of the filler 12 be at least partially coated, and ideally totally encapsulated. This can occur in two ways, first in the method described above where the particles are coated with a Silane/Peroxide and then combined at temperatures above the carrier resin's melting point at which time total encapsulation is expected and a covalent bond is created between the particles and the carrier or other resins in the compound, or second, as is described below, maleated polyolefins with or without the above method of treatment of Silane/Peroxide are used and believed to encapsulate the particles. At present, total encapsulation of the particles is believed to be accomplished by an additional compatibilizer or encapsulator 68 by a functionalized polyolefin compatible with the base resin 80 and reactive with or capable of physical association with the surface of each fly ash particle. A polyolefin grafted with maleic anhydride, also called a maleated polyolefin, with a melt flow index sufficiently low to facilitate some coating of the fly ash particles is preferred because it is believed that the wetting of the fly ash particles is enhanced when it is heated. Polybond®3009 compatibilizer, which is also sold by Chemtura, is a maleated HDPE that has been found to be particularly suitable as the carrier resin 76 for the master batch 78 to form the desired compositions 84.

Without being limited to a particular theory, it is believed that the fly ash particles couple with, and effect a covalent bond with, the Polybond® 3009 material. At the same time, the Polybond® 3009 is believed to function as a compatibilizer between the particles and the base resin 80 to enhance the mixing with, and dispersion of the particles into, the base resin 80. It is also believed that the Polybond® 3009 acts as a compatibilizer for the various resins, base resins 80 being used in the final composition 84, helping them to have a more effective blending of different resin types. As an alternate to the maleic-anhydride-modified high density polyethylene, a maleic anhydride grafted oil, maleic anhydride grafted liquid monomer or a maleic anhydride grafted liquid polymer may be used to coat as much of the surfaces of the particles of the filler 12 as possible. A small portion (2% to 5%) of the liquids (like an oil or a liquid polymer) can be used to coat the particles by blending them in a suitable blender like a Henschel high intensity blender or a continuous flow ribbon blender in the process of forming the master batch 78 or the final composition 84.

As seen in FIG. 1, the master batch 78 is supplied for further mixing with a base resin 80. The base resin 80 can be considered a "target" resin because it is recognized that the master batch 78 is being formulated or formed to be mixed with it by a manufacturer in the final melt shaping of a product 88 by any recognized production device 86 (e.g., injection molding, flow molding, extruding, vacuum molding). That is, the base resin 80 is combined with the master batch 78 to form the composition 84 that is used in the manufacture of a product 88. The base resin 80 may be any suitable polyethylene. ExxonMobil 6605.70 HDPE (0.948 Density; 5 g/10 min MFI); Dow DMDA-8007 NT 7 HDPE (0.965 Density; 8.3 g/10 min. MFI); and Marlex 9708 HDPE (0.962 Density; 8 g/10 min.MFI) have been found suitable as a base resin 80 in the samples tested to date as discussed hereinafter.

A suitable mineral oil 94 is mixed with a high performance stryrenic block copolymer 92. The resulting blend 90 softens and enhances the flowability of the composition 84 when in melt form as it is mixed 79 while contributing to the strength and elasticity of the final product 88. That is, the base resin 80 and the master batch 78 create a composition in melt form that could wet the surfaces of the processing equipment and reduce the production cycle time or throughput time. Adding the blend 90 of the mineral oil 94 and the copolymer 92 contributes to the flowability of the composition 84 and is also believed to contribute to the toughness of the product 88. In practice, it has been found that SEPTON® 4033 flakes available from Kuraray America, Inc. of Houston, Tex. are particularly useful as the copolymer 92. Hydrobite® 550 PO white mineral oil offered by Sonneborn, LLC of Mahwah, N.J. has been found to be particularly useful as the mineral oil 94. In use, it has been found that the blend 90 is best when mixed in a ratio of about nine units of copolymer 92 to one unit of oil 94. Other similar mineral oils such as Penreco® Drakeol® mineral oil are also believed to be suitable for use.

The master batch 78 is typically converted to pellets or a similar solid mechanical shape as an intermediate product and transported to a location selected for preparing the composition 84, which can be the final product or also another intermediate product, depending on the type of processing equipment used to make the composition 84. The quantities of filler 12, acid scavenger 64, antioxidant 66, carrier resin 76 and encapsulator or compatibilizer 68 are selected such that when the master batch 78 is mixed with pre-selected amounts of the base resin 80, the desired amount of filler 12 is introduced into, dispersed within, and constantly maintained within the composition 84.

The master batch 78 is typically in a dry solid form such as pellets, and the base resin 80 is also typically in a dry solid form such as pellets. The master batch 78 and the base resin 80 can be mixed to form a dry blend using a dry pellet blender like one made by Maguire Products Inc. of Aston, Pa. The dry blend of materials is effectively the composition 84 that is introduced into a suitable manufacturing machine 86, like an injection molding machine.

It may be noted that the use of fractional or low melt resin as an impact modifier 70 beneficially affects the overall cost of the composition 84. The fractional melt is believed to be available at a price that is less than the price of the base resin 80. While fractional melt materials are being used as the impact modifier 70, it should be understood that other low melt index (melt flow index (MFI) of less than about 2 or 3) materials should be also suitable for use as the impact modifier 70. Further, one can use reprocessed or reground sources as the impact modifier 70, further lowering the cost of the resulting composition 84. Reprocessed or "regrind" may be used for the base resin as well as fractional and low melt resins 82 used in forming the compositions 84.

Of course, it may be noted that the master batch 78 contains a notable portion and sometimes a weight majority of fly ash as filler 12. Fly ash and fly ash with cinders are products of combustion and otherwise considered a waste or residue. Use of a filler 12 such as fly ash in the composition 84 further lowers its cost because the filler replaces or reduces the amount of base resin 80 used in forming a particular product. In other words, a waste material, namely, fly ash (and sometimes fly ash with cinders), is being converted from a waste to a beneficial use that not only eliminates the waste but also reduces the amount of expensive resin used in forming a particular product while enhancing desired physical properties. Further, it has been noted that the use of fly ash as a filler 12 increases the flowability of the master batch 78 and the composition 84 so that less energy is needed to pump the composition in the manufacturing process leading to significant savings in energy over time. Similarly some compositions are made with a heat or melt index that is lower than neat resin so that less energy is needed to heat and melt the resin and in turn leading to less time to cool. In turn the manufacturing process can be faster. That is, the cycle time to form one product is reduced.

Notwithstanding the use of fractional or lower melt index materials as the impact modifier 70 and the use of a substantial amount of filler 12, it has been noted that the mechanical characteristics of the resulting product(s) 88 are comparable to the unmodified thermoplastic resins currently commercially used, and in many cases better than those resins. In other words, use of the filler 12 with the impact modifier 70 leads to savings in energy and savings in material because one is using less resin while using or consuming a waste material like fly ash. At the same time, the resulting product has physical properties that are the same as or better than the naked or pure resin.

Testing was undertaken by following steps in a sequence that is believed to be required to achieve the desired results. First a test Master Batch I was formed (See Table I hereinafter) by mixing Eclipse Fly Ash Blend B in which the fly ash was processed by suitable mechanical means like sifting and then demagnetization (remove magnetic particles). The fly ash in Blend B was selected with a PSD in which the largest particles are less than about 844 microns (such a particle may be called a cinder) but with 90 percent of the particles (in number) less than 1 micron in effective diameter. The Eclipse Fly Ash Blend B. may be purchased from Revolutionary Plastics, LLC of Las Vegas and is about 70% percent by weight of the master batch 78. However, higher or lower percentages have been used. The acid scavenger 64 and the antioxidant 66 together are about 0.84 percent by weight of the master batch 78. The carrier resin 76 that also functions as a compatibilizer may be about 19.16 percent by weight of the master batch 78. The encapsulator is PolyBond 3009 and is from about 5 percent the master batch 78. The impact modifier 70 is a blend of Septon and mineral oil and in total is about 5% of the Master Batch. In normal practice, the materials are melt-mixed and then extruded as pellets for further processing when re-melted and mixed with other materials to form the composition as hereinafter discussed. The Master Batch I may also be purchased from Revolutionary Plastics, LLC and is presently identified as product 5519-8.

Table I following also shows the composition of Master Batch II that is not now available but is expected to become available from Revolutionary Plastics, LLC in due course. It shows the use of silane 14 with perioxide powder or flakes 16 mixed into and with a substantial quantity of carrier resin (Dow DMDA 8007) without the septon and oil mixture and with a reduced amount of antioxidants and acid scavenger.

TABLE 1

| MASTER BATCH | | |
|---|---|---|
| Ingredients | I (5519-8) | II 5510 with Silane |
| Eclipse Fly Ash Blend B (Revolutionary Plastics, Las Vegas, NV) | 70% | 18.83% |
| Silane Liquid | 0% | 0.1374% |
| (These are premixed to equal 1% of the Eclipse) Peroxide Flake or Powder | | 0.0509% |
| Carrier Dow DMDA 8007 is an 8 melt HDPE (high density polyethylene) | 19.16% | |
| Marlex HHM 5202BN HDPE (0.951 Density; 0.35 g/10 min. MFI | 0 | 80.756% |
| Hydrotalcite acid scavenger; | 0.35% | 0.094% |
| Chemtura Anox NDB antioxidant: | 0.245% | 0.0659% |
| Chemtura Alkanox antioxidant | 0.245% | 0.0659% |
| Chenitura PolyBend 3009 maleated polyethylene (0.95 Density; 3-6 g/10 min MFI) | 5% | 0% |
| Septon 4033 | 4.5% | |
| Drakeol 30 Oil | 0.5% | |
| Total | 100% | 100% |

In order to demonstrate the improvements including the ability to vary physical parameters as discussed herein before, four samples were tested. The composition of each of the samples (A-D) are shown in table II. The physical properties are set out in Table III.

TABLE II

| Example (Wt. %) | SAMPLES | | | |
|---|---|---|---|---|
| | A | B | C | D |
| Dow DMDA 8007 is an 8 melt HDPE (high density polyethylene) Base | 100 | 60 | 60 | 62.82 |
| Marlex HHM 5202BN HDPE (0.951 Density; 0.35 g/10 min. MFI) Regrind(It should be noted that 30% of the master batch II used this resin as the carrier resin) | | 30 | 30 | 0 |
| Master batch I | 0 | 10 | 10 | 0 |
| Master batch II | 0 | | | 37.65 |
| Total | 100 | 100 | 100 | 100 |

As noted before, the compositions disclosed are composed of ingredients which can be varied to vary certain physical characteristics of the resulting product like product 88. Impact resistance is an important criteria for many compositions 84 and the resulting products 88. Table III presents test data for Samples A through D.

TABLE III

| Physical Properties | | | | |
|---|---|---|---|---|
| Example | A | B | C | D |
| Specific Gravity ASTM D792 | 0.953 | 1.007 | .999 | .995 |
| Shore D Hardness (ASTM D2240) | 66 | 69.2 | 68.6 | 68.4 |
| ASTM D256 Impact Resistance (ft-lbf/in) | 2.4 | 11.091 | 11.968 | 12.72 |
| ASTM D256 Impact Strength (ft-lbf/in2) | 6 | 27.727 | 29.921 | 31.8 |
| ASTM D638 Type 4 Rigid Tensile Strength Stress Yield (psi)3 in/min. | 3,550 | 4,195 | 4,266 | 4.492 |
| ASTM D638 Type 4 Rigid Tensile Modulus Youngs Modulus (psi)3 in/min | 184,088 | 218,484 | 211,368 | 223,658 |
| ASTM D790 Flexural Strength Bending Strength @ Peak (lbf/in2) | 2,434 | 2,699 | 2,606 | 2,750 |
| ASTM D790 Flexural Modulus Bending Modulus (lbf/in2) | 162,651 | 171,308 | 165,639 | 182,170 |
| Avg Peak Injection Pressure in Bars | 2,012 | 1,898 | 1,897 | 1,894 |
| Avg. Peak Injection pressure for making test Plaques (lb/in$^2$) | | 1,115 | 1.123 | 1.144 |

In Table III we see that the physical properties of samples B and C show substantial enhancement over the naked or raw resin which is sample A. That is, one sees an improvement in impact strength by over a factor of 4 while at the same time seeing some minor improvement in the elasticity or bendability of the material. At the same time there is nearly a 10% reduction in injection pressure leading to savings in energy during operations. Of course comparing samples B and C with sample D, it can be seen that a master batch made with silane and peroxide leads to improved impact strength, improved elasticity with comparable injection pressures. Thus, use of silane leads to a less expensive master batch while yielding a final product that has physical properties that are improved over those samples made using septon.

It should also be noted that the ESCR (environment stress crack resistance) of the material can be increased by using these low melt or fractional melt resins. In other words the outdoor durability of the final product is improved. In side by side tests of the formulations above, the ESCR of the 8007 base resin, which is 2.5 hours of accelerated exposure was improved to 18 hours of accelerated exposure.

Those skilled in the art will recognize that the disclosed processes may be practiced using materials and machines that may be different from those identified hereinabove without departing from the principles of the processes as disclosed. That is, the user can choose how to vary the ingredients to attain the desired better physical properties, and the user can make products that are less expensive with selected enhanced physical properties while following the principles as herein disclosed.

The invention claimed is:

1. A method of forming a composition comprising
providing a filler having a particle size distribution in which over ten percent of the particles of the filler have an effective diameter of less than 1 micron;
providing a coupling agent material;
providing a mixer having a volume to receive material and means for mixing said material, said mixer having sealing means operable between a first position to seal said volume and a second position to unseal said volume, and said mixer having cooling means to cool the material in said volume;
placing said filler and said coupling agent material in said volume;
operating said sealing means to said first position to seal said volume;
operating said mixer to mix and to heat said filler and said coupling agent material in said volume to a temperature at which said coupling agent changes to and becomes a gas comprised of gas particles and further operating said mixer to mix said filler with said coupling agent material to associate said gas particles with at least said particles of said filler having an effective diameter of less than 1 micron to form a blend;
operating said cooling means one to cool said blend;
operating said sealing means to said second position to unseal said volume;
providing an acid scavenger, an anti oxidant, and a resin; and
mixing said acid scavenger, said anti oxidant, said blend and resin to form one of said composition and a master batch.

2. The method of claim 1 wherein said coupling agent material is silane as a liquid.

3. The method of claim 2 wherein said resin is a carrier resin to form said composition and wherein said resin is a base resin to form said master batch.

4. The method of claim 3 further providing peroxide in powder form and wherein said coupling agent material is a fluid mixture of said silane as a liquid and said peroxide.

5. The method of claim 4 wherein said means for mixing is a pump which in operation heats and mixes said coupling agent material and said filler in said volume.

6. The method of claim 5 wherein said carrier resin is a polyolefin material.

7. The method of claim 2 further including providing a blend of mineral oil mixed with a styrenic block copolymer, further including mixing said blend of mineral oil mixed with SEPTON with one of said carrier resin and said base resin to form said composition.

8. The method of claim 3 wherein said master batch further includes an impact modifier.

9. The method of claim 3 wherein said antioxidant is one of a benzene based antioxidant, a phosphorous based antioxidant and combinations thereof.

10. The method of claim 9 wherein said acid scavenger is hydrotalcite.

11. The method of claim 10 wherein said carrier resin is one of a melt resin having a melt flow index of about less than 3 and a fractional melt polyolefin resin.

12. The method of claim 6 further including a fractional melt resin blended with one of and with both of the base resin and the master batch.

13. The method of claim 6 further including a combination of LLDPE or LDPE resins with HDPE to modify physical properties and enhance the time to crystallize.

14. The method of claim 1 wherein said pump is operated to heat to at least about 82 degrees Fahrenheit.

15. The method of claim 2 further including adding to said mixer and mixing a resin having a melt flow index of less than about 3.

* * * * *